United States Patent [19]

Pelrine

[11] 4,278,564

[45] Jul. 14, 1981

[54] METHOD FOR MODIFYING THE SHAPE SELECTIVITY OF FERRIERITE

[75] Inventor: Bruce P. Pelrine, Trenton, N.J.

[73] Assignee: Mobil Oil Corporation, New York, N.Y.

[21] Appl. No.: 89,691

[22] Filed: Oct. 30, 1979

[51] Int. Cl.³ .............................................. B01J 29/06
[52] U.S. Cl. ................................. 252/450; 252/455 Z
[58] Field of Search ........................... 252/450, 455 Z; 423/118, 132; 208/120

[56] References Cited

U.S. PATENT DOCUMENTS

| 2,495,751 | 1/1950 | Mills et al. ........................ 252/450 X |
| 2,772,317 | 11/1956 | Smith, Jr. et al. ................ 252/450 X |
| 3,492,341 | 1/1970 | Trevillyan ......................... 252/450 X |
| 3,836,561 | 9/1974 | Young ................................. 252/450 |
| 3,997,474 | 12/1976 | Miale et al. ........................... 252/450 |

*Primary Examiner*—Carl F. Dees
*Attorney, Agent, or Firm*—Charles A. Huggett; Michael G. Gilman; Charles J. Speciale

[57] ABSTRACT

A method for modifying the shape selectivity of natural ferrierite in the catalytic conversion of hydrocarbons which comprises contacting the natural ferrierite with oxalic acid. By this method the catalytic properties are enhanced, such that hydrocarbons, other than normals, are able to be cracked selectively.

5 Claims, No Drawings

METHOD FOR MODIFYING THE SHAPE SELECTIVITY OF FERRIERITE

BACKGROUND OF THE INVENTION

1. Field of the Invention

This invention relates to a method for modifying the shape selectivity of natural ferrierite in the catalytic conversion of hydrocarbons so that hydrocarbons, other than normals, are converted, e.g. cracked selectively.

2. Description of the Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure as determined by X-ray diffraction within which there are a large number of smaller cavities which may be interconnectd by a number of still smaller channels or pores. These cavities and pores are precisely uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formulation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-35 (U.S. Pat. No. 4,016,245) and zeolite ZSM-23 (U.S. Pat. No. 4,076,842), merely to name a few.

It is well known in the prior art that certain zeolites such as zeolites A, X. or Y and the naturally occurring zeolites chabazite, erionite, faujasite and mordenite can be stability-enhanced by methods comprising ion exchange and/or heating. U.S. Pat. Nos. 3,354,077; 3,375,065; and 3,402,966 describe such methods. U.S. Pat. No. 3,997,474, on the other hand, describes a method for activating naturally occurring ferrierite to make it selective primarily for cracking normal paraffins by treatment with ammonium ions and HF.

SUMMARY OF THE INVENTION

In accord with the present invention a method of modifying the shape selectivity of ferrierite, allowing branched-chain hydrocarbons to be cracked selectively, has been found which comprises contacting natural ferrierite with oxalic acid under controlled conditions of time and temperature. By this method, the catalytic properties of naturally occurring ferrierite may be enhanced in that the treated ferrierite exhibits a more open pore system with respect to the untreated ferrierite allowing hydrocarbons, other than normals, to be cracked. Moreover, by exchanging the above treated ferrierite with diammonium oxalate, a more useful cation (ammonium) is exchanged into the ferrierite while simultaneously chelating the exiting cation. Thus, any iron present as an impurity is removed as a chelate thereby eliminating excess methane production for certain reactions.

Description of Preferred Embodiments

The zeolite useful in the practice of this invention is natural ferrierite. The naturally occurring ferrierite has been described by Graham (Roy. Soc. Canada, Proc. and Trans., 3rd Ser., 12,185-190) and by Staples (Am. Mineral, 40 1095-99). The formula of the natural mineral ferrierite is given as $(Na, K)_4Mg_2(Si_{30}Al_6)$ $O_{72}(OH)_2 \cdot 18H_2O$. The oxide formula is given in "Zeolite Molecular Sieves," John Wiley and Sons, Inc. (1974) as $(Na_2, Ma)O \cdot Al_2O_3 \cdot 11.1\ SiO_2 \cdot 6.5\ H_2O$.

The ferrierite ore employed as starting material in the method of this invention is an ore having about 95% ferrierite which has a very low hexane cracking activity $\alpha$ (1). When it is ion exchanged to its ammonium form and calcined, this material is stable, moderately active ($\alpha$-ranging from 25-200) and selective for cracking straightchain hydrocarbons. These characteristics of ammonium ferrierite are not altered by successive conventional ion exchanges with ammonium salts.

Cracking activity is also indicated quantitatively by the term alpha ($\alpha$) which is an indication of the relative catalytic cracking activity of the catalyst compared to a standard catalyst, $\alpha$ is the relative rate constant (rate of n-hexane conversion per unit volume of oxides composition per unit time). It is based on the activity of highly active silica alumina cracking catalyst taken as $\alpha - 1$.

The $\alpha$-test is further described in a letter to the editor entitled "Superactive Crystalline Aluminosilicate Hydrocarbon Cracking Catalysts" by P. B. Weisz and J. N. Miale, Journal of Catalysis, Vol. 4, pp. 527-529 (August 1965). For additional description of the $\alpha$-test see U.S. Pat. No. 3,354,078 issued to Miale and Weisz.

In carrying out the present process, natural ferrierite is subjected to contact, in one embodiment, with aqueous oxalic acid followed by exchange with an aqueous 1M diammonium oxalate solution. Oxalic acid treatment can be (1) metered over a period of time (2) by refluxing, and (3) in an autoclave with stirring. Concentration of the oxalic acid can be between about 1 and 12%. Molarity of the diammonium oxalate may be between about 0.1 and 10. Temperature conditions for oxalic acid treatment are between about room temperature and 200° C., for exchange treatment between about room temperature and 100° C., while contact time for both treatments is from about 1 to 10 days.

By the foregoing treatment, the zeolitic pore system may be, in effect, made more open. The result of this enhancement of a more open pore system is that branched hydrocarbons, such as 3-methylpentane and 2,3-dimethylbutane may be cracked selectively. Because of this resultant ability to crack branched hydrocarbons selectively, the invention treated ferrierite can be expected to exhibit catalytic properties similar to zeolite ZSM-35, its synthetic analog (U.S. Pat. No. 4,016,245).

As in the case with many catalysts, it may be desirable to incorporate the completed catalyst with another material resistant to the usual conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates, sols or gels, including mixtures of silica and metal oxides. Frequently, the zeolite materials have been incorporated into naturally occurring clays, e.g. bentonite and kaolin. These materials, i.e., clays oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the product from the process of this invention include the montmorillonite and kaolin family, which families include the sub-bentonites, and the kaolins commonly known as Dixie, McNamee, Georgia and Florida clays or others in which the main mineral constituents are halloysite, kaolinite, dickite, nacrite, or anauxite. Such clays can be used in the raw state as originally mined or initially subjected to calcination, acid treatment or chemical modification.

In addition to the foregoing materials, the catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these compounds could also be used. The relative proportions of finely divided activated and inorganic oxide gel matrix may vary widely with the ferrierite content ranging from about 1 to about 90 percent by weight and more usually in the range of about 2 to about 80 percent by weight of the composite.

In order to more fully illustrate the nature of the invention and the manner of practicing same, the following non-limiting examples are presented.

The examples below describe the various treatments of natural ferrierite (Examples 1-5) and the catalytic results, (Examples 6-10) corresponding to and emanating from the products produced by the methods described therein.

EXAMPLE 1

This may be considered the base case or a conventional method by which ferrierite is converted into the ammonium form and subsequently to the acid form by air calcination.

The treatment (ion exchange) was made by refluxing 30 gms. of ammonium nitrate with 10 gms of ferrierite in 30 cc $H_2O$ for 3 days. At the end of 3 days, the $NH_4$—ferrierite was washed thoroughly with water and dried. The resulting $NH_4$-ferrierite was then calcined at 1° C./min to 538° C. and held at 538° C. for 3 hours.

EXAMPLE 2

5.0 Gms of ferrierite were placed into 300 cc of 1 M diammonium oxalate and refluxed for 3 days. After 3 days, the $NH_4$-ferrierite was washed and dried at 120° C. for 3 hours. Calcination of this sample was as in Example 1.

EXAMPLE 3

In this treatment, oxalic acid was used. 26.8 Gms of ferrierite were placed into 200 cc of $H_2O$ and heated to reflux. 4.56 Gm of oxalic acid was dissolved into 100 cc of $H_2O$. The 100 cc solution of oxalic acid were then pumped into the ferrierite/$H_2O$ at 4 cc/hr. After 25 hours, completeaddition of the oxalic acid solution was made. The resulting ferrierite was washed and then exchanged with 600 cc 1 M diammonium oxalate at reflux for 2 days. At the end of the exchange, the resulting $NH_4$-ferrierite was washed and dried. Calcination followed as in Example 1.

EXAMPLE 4

10 Gm of ferrierite were refluxed, directly, with 4.5 gm oxalic acid in 100 cc $H_2O$ for 3 days. After 3 days, the ferrierite was washed and dried as before. The sample was exchanged with 42 gm of diammonium oxalate in 300 cc $H_2O$ at reflux for 3 days. After ion exchange, the resultant $NH_4$-ferrierite was washed and dried. Calcination followed as in Example 1.

EXAMPLE 5

This particular treatment involved the use of a stirred autoclave in the enhancement of ferrierite. 25 Gm of oxalic acid were placed into 200 cc of $H_2O$ in a 100 cc autoclave. Then 10 gm of ferrierite were added. The autoclave was sealed and heated to ~170° C. with stirring. After 8 days, the ferrierite was removed. Recovered 7.6 gm. The ferrierite (7.6 gm) was ion-exchanged with 30 gm of diammonium oxalate in 300 cc $H_2O$ at reflux for 5 days. The resulting $NH_4$-ferrierite was washed and dried. Calcination followed as in Example 1.

Analytical results for elemental analysis of the variously treated ferrierite samples are tabulated immediately below.

TABLE 1

| Analysis | Ferrierite Starting Material | Example 1 | 2 | 3 | 4 | 5 |
|---|---|---|---|---|---|---|
| $SiO_2$ | 67.3% | 69.5% | 71.6% | 71.9% | 73.6% | 84.8% |
| $Al_2O_3$ | 12.1 | 12.6 | 12.9 | 12.3 | 11.7 | 11.3 |
| Na | 1.70 | 0.21 | 0.19 | 0.19 | 0.18 | 0.13 |
| Ca | 0.19 | 0.03 | 0.15 | 0.04 | 0.07 | — |
| K | 4.40 | 4.10 | 3.67 | 3.70 | 3.51 | 2.70 |
| Mg | 0.31 | 0.21 | 0.22 | 0.21 | 0.23 | 0.11 |
| Fe | 0.75 | 0.75 | 0.098 | 0.092 | 0.039 | 0.30 |

Examination of Table 1 shows the effect of the various treatments on the cation concentration in the resulting ferrierites. The treatment of Example 1 ($NH_4NO_3$) is only modestly effective, especially for removal of potassium and iron. The remaining treatments seem especially effective for iron removal and exchange of the various cations. A high degree of sodium and calcium exchange was evident. When the autoclave treatment was employed, potassium removal was enhanced. Also, the level of magnesium was further reduced by the autoclave treatment. Crystallinity after autoclave treatment is shown below in Table 2.

TABLE 2

| Crystallinity of Treated Ferrierites | |
|---|---|
| TREATMENT | CRYSTALLINITY[1] |
| Initial | 100 |
| 1 | 95 |
| 2 | 117 |
| 3 | 104 |
| 4 | 124 |
| 5 | 76 |

[1] Relative to ferrierite starting material

In Table 3, listing the results of Examples 6-10 in tabular form, are shown the catalytic results for cracking of a 1:1:1 (by wt.) mixture of normal hexane, 3-methylpentane and 2,3-dimethylbutane at 1000° F. and 1 atmosphere pressure. Included in the table are results for conversion of the above and calculated rate constants.

TABLE 3

| | | Wt. % Converted | | | Rate Constants, K | | | | |
|---|---|---|---|---|---|---|---|---|---|
| Example | FERRIERITE TREATMENT | $C_6$ | MP | DMB | $C_6$ | MP | DMB | $K_{C6}/K_{MP}$ | $K_{MP}/K_{DM}$ |
| 6 | NH$_4$NO$_3$ (Product of Example 1) | 43.0 | 0 | 0 | 0.203 | — | — | — | — |
| 7 | Diammonium Oxalate (Product of Example 2) | 50.4 | 0 | 0 | 0.180 | — | — | — | — |
| 8 | Oxalic Acid-Metered (Product of Example 3) | 59.3 | 29.0 | 24.2 | 0.246 | 0.098 | 0.076 | 2.5 | 1.3 |
| 9 | Oxalic Acid-Reflux (Product of Example 4) | 44.7 | 2.9 | 2.3 | 0.174 | 0.0086 | 0.0068 | 19 | 1.3 |
| 10 | Oxalic Acid-Autoclave (Product of Example 5) | 32.8 | 11.5 | 8.9 | 0.151 | 0.047 | 0.036 | 3.1 | 1.3 |

As can be seen in this table containing the results for cracking of n-hexane, 3-methylpentane and 2,3-dimethylbutane, the treatments of Example 3-5 have enhanced ferrierite to the extent that it now is more open and therefore cracks selectively, the branched hydrocarbons, 3-methylpentane and 2,3-dimethylbutane.

On the other hand, ammonium nitrate and diammonium oxalate (treatments of Examples 1 and 2) while making the ferrierite active, did nothing to enhance the openness of the porous system as witnessed by the lack of cracking of the branched hexanes. Only when oxalic acid was used are the branched hexanes cracked selectively. It is interesting to compare these observations with the elemental analyses. Looking at cation contents, there is no obvious explanation of why ammonium nitrate and diammonium oxalate treatments do not yield a ferrierite which will crack the branched hexanes, since the concentrations of cations remaining after all treatments are not dissimilar. It may be that it is not the gross level of cations remaining after treatment, but their positions within the structure of the ferrierite which is important. In other words, the siting of some of the cations will determine whether or not the more bulky hexanes gain access to a cracking site.

Also noteworthy is that most of the treated ferrierites are shape selective for the isohexanes (i.e., methylpentane > dimethylbutane). This is illustrated by the relative rate constants, $K_{mp}/K_{dmb}$. For the treatments of Examples 3, 4 and 5, the ratio exceeds unity.

What is claimed is:

1. A method for modifying the shape selectivity of natural ferrierite which comprises first contacting said ferrierite with oxalic acid and then contacting the resultant oxalic acid treated-ferrierite with an aqueous diammonium oxalate solution.

2. A method for modifying the shape selectivity of natural ferrierite which comprises first contacting said ferrierite with oxalic acid at a temperature between about room temperature and 200° C. for a period between about 1 and 10 days and then contacting the resultant oxalic acid treated-ferrierite with an aqueous diammonium oxalate solution at a temperature between about room temperature and 100° C. for a period between about 1 and 10 days.

3. A method according to claim 2 wherein the reaction is conducted in a stirred autoclave.

4. The catalyst product produced by the method of claim 1.

5. The catalyst product produced by the method of claim 2.

* * * * *

UNITED STATES PATENT AND TRADEMARK OFFICE
CERTIFICATE OF CORRECTION

PATENT NO. : 4,278,564
DATED : July 14, 1981
INVENTOR(S) : Bruce P. Pelrine

It is certified that error appears in the above-identified patent and that said Letters Patent are hereby corrected as shown below:

Column 1, Line 49, delete "formulation" and insert -- formation --.

Column 1, Line 66, delete "3,402,966" and insert -- 3,402,996 --

Column 2, Line 33, delete "$(Na_2, Ma)O.Al_2O_3.11.1\ SiO_2.6.5\ H_2O$" and insert -- $(Na_2, Mg)O.Al_2O_3.11.1\ SiO_2.6.5\ H_2O$ --.

Column 2, Line 37, delete "$\alpha(1)$" and insert -- $\alpha<1$ --.

Column 2, Line 49, delete " $\alpha-1$" and insert -- $\alpha=1$ --.

Column 3, Line 46, delete "compounds" and insert --components--.

Column 4, Line 19, delete "completeaddition" and insert -- complete addition --.

Column 4, Line 38, delete "100cc" and insert --1000cc--.

Column 5, Line 39, delete "Example" and insert -- Examples --.

Column 6, Line 3, delete "all" and insert -- <u>all</u> --.

*Signed and Sealed this*

*Twenty-seventh* Day of *October 1981*

[SEAL]

*Attest:*

GERALD J. MOSSINGHOFF

*Attesting Officer*     *Commissioner of Patents and Trademarks*